United States Patent
Knipe

(10) Patent No.: US 8,432,597 B2
(45) Date of Patent: Apr. 30, 2013

(54) MICRO-MIRROR HINGE

(75) Inventor: Richard L. Knipe, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 164 days.

(21) Appl. No.: 11/429,840

(22) Filed: May 8, 2006

(65) Prior Publication Data

US 2007/0258125 A1    Nov. 8, 2007

(51) Int. Cl.
*G02B 26/00* (2006.01)
(52) U.S. Cl.
USPC ........ 359/224.2; 359/224.1; 359/290; 359/291; 359/292; 359/298; 359/303; 359/315; 359/318; 359/320

(58) Field of Classification Search .......... 359/223, 359/224, 290–292, 298, 303, 315, 318, 320
See application file for complete search history.

(56) References Cited

U.S. PATENT DOCUMENTS

| | | | | | |
|---|---|---|---|---|---|
| 5,061,049 | A | * | 10/1991 | Hornbeck | 359/298 |
| 5,083,857 | A | * | 1/1992 | Hornbeck | 359/291 |
| 5,629,794 | A | * | 5/1997 | Magel et al. | 359/290 |
| 5,739,941 | A | * | 4/1998 | Knipe et al. | 359/290 |
| 6,650,461 | B2 | * | 11/2003 | Atobe et al. | 359/291 |
| 2006/0082858 | A1 | | 4/2006 | Heureux | |

* cited by examiner

*Primary Examiner* — Evelyn A. Lester
(74) *Attorney, Agent, or Firm* — Warren L. Franz; Wade J. Brady, III; Frederick J. Telecky, Jr.

(57) ABSTRACT

According to one embodiment of the present invention a digital micro-mirror device is taught that includes a pixel occupying an area of the device and a hinge coupled to the pixel and positioned such that at least a portion of the hinge falls outside the area of the pixel.

10 Claims, 1 Drawing Sheet

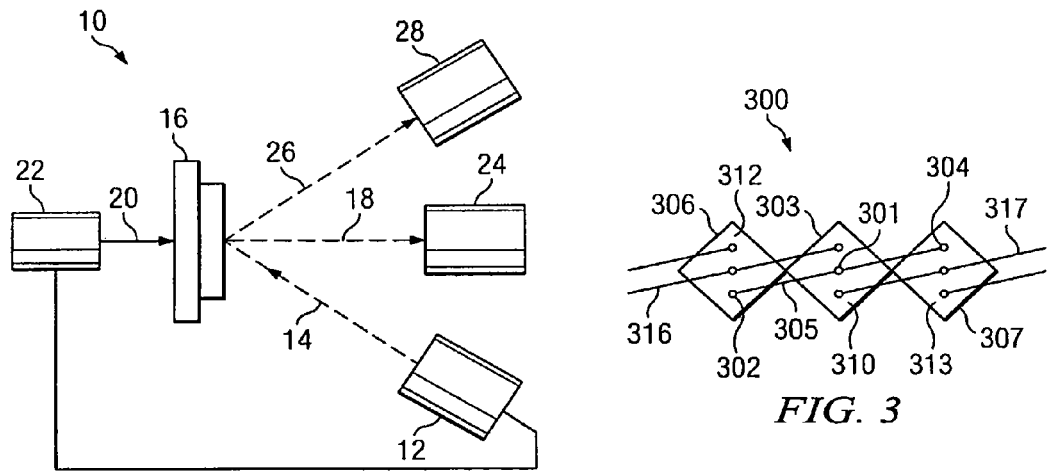
FIG. 1
FIG. 3
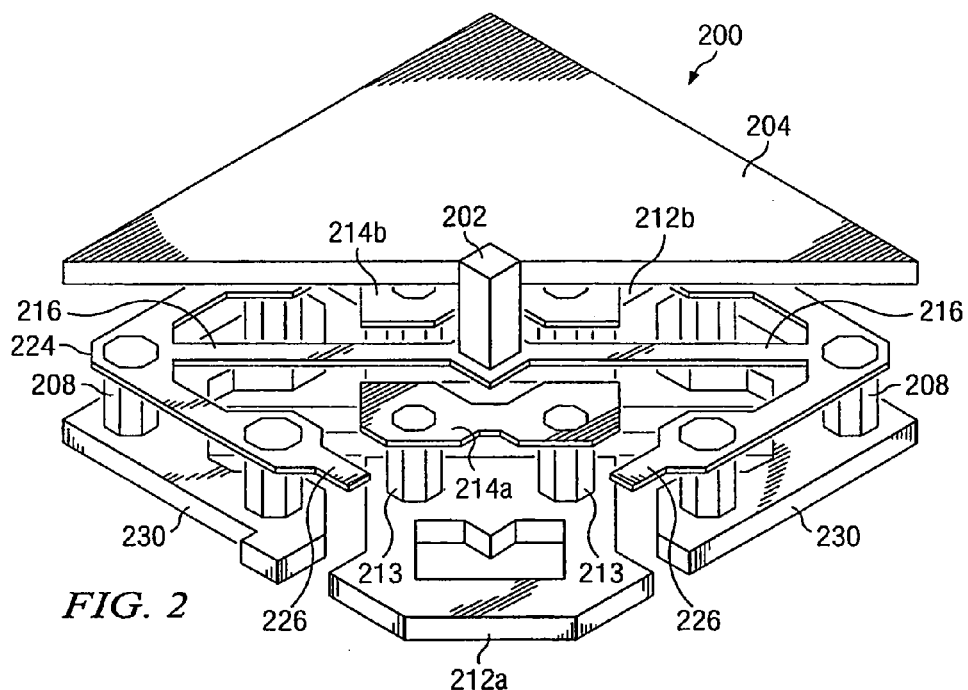
FIG. 2
*(PRIOR ART)*

US 8,432,597 B2

MICRO-MIRROR HINGE

TECHNICAL FIELD OF THE INVENTION

This invention relates in general to image display systems, and more particularly to a hinge of a micro-mirror element.

BACKGROUND OF THE INVENTION

Light processing systems often involve directing light towards a display such that an image is produced. One way of effecting such an image is through the use of digital micro-mirror devices (DMD) available from Texas Instruments. In general, light is shined on a DMD array having numerous micro-mirrors. Each micro-mirror is selectively controlled to reflect the light towards a particular portion of a display, such as a pixel. The angle of a micro-mirror can be changed to switch a pixel to an "on" or "off" state. The micro-mirrors can maintain their "on" or "off" state for controlled display times.

The micro-mirrors are able to change angles by turning on a hinge mounted beneath them. To increase the resolution provided by a DMD while maintaining the DMD's size, the micro-mirrors or pixels are reduced in size. These smaller pixels usually require shorter hinges. Shorter hinges can cause the turn-on voltage to increase, as more work is required to twist a shorter hinge when changing the angle of the micro-mirror. Attempts to reduce the turn on voltage have included reducing the thickness of the hinge. However, thinner hinges are difficult to manufacture, producing smaller yields and are subject to parametric problems such as sagging.

According to one embodiment of the present invention a digital micro-mirror device includes a pixel occupying an area of the device and a hinge coupled to the pixel and positioned such that at least a portion of the hinge falls outside the area of the pixel.

Certain embodiments may provide a number of technical advantages. For example, a technical advantage of one embodiment may include the capability to provide a decreased digital micro-mirror device (DMD) mirror size. Another technical advantage of other embodiments may include the capability to provide an increased DMD resolution. An advantage of another embodiment may include lower power consumption by the DMD. Certain embodiments of the present invention can allow for decreased pixel size and increased resolution without the manufacturing difficulties associated with reducing hinge length. In addition, some embodiments can allow thicker hinges and minimize sagging effects.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a block diagram of one embodiment of a portion of a display system;

FIG. 2 illustrates a conventional digital micro-mirror device (DMD) pixel element; and FIG. 3 shows a top functional view of pixel hinges traversing areas beyond the pixel the hinge supports according to the teachings of the invention.

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

FIG. 1 is a block diagram of one embodiment of a portion of a display system 10. In this example, display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In the illustrated embodiment, modulator 16 comprises a digital micro-mirror device (DMD).

As will be described in more detail below, a DMD is a micro electro-mechanical device comprising an array of hundreds of thousands of tilting digital micro-mirrors. In a flat state, each micro-mirror may be substantially parallel to projection lens 24. From the flat state, the micro-mirrors may be tilted, for example, to a positive or negative angle corresponding to an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

As discussed above, display system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state.

FIG. 2 illustrates additional details of a conventional DMD pixel element 200, which may form a portion of modulator 16. The DMD pixel element 200 of FIG. 2 may include a hinge portion, an address portion, and a mirror portion. The hinge portion includes a hinge 216, supported on each side by hinge posts. Six bias vias 208 support spring tips 226 and hinge 216 above the lower layer 260. The bias vias 208 may also operate to relay a bias voltage to hinge 216. Micro-mirror 204 is supported above the hinge 216 upon a single mirror via 202. In addition to providing support for the micro-mirror 204, the mirror via 202 may conductively transfer the bias voltage to the micro-mirror 204. Accordingly, a bias voltage may be applied to the bias pad 220. The bias voltage may then be conductively transferred to the spring tips 226 and hinge 216 through the six bias vias 208. The bias voltage may be then further transferred from the hinge 216 to the micro-mirror 204 through the mirror via 202.

The address portion of the DMD pixel element 200 includes two address pads 212a, 212b that each connect to raised address electrodes 214a, 214b, respectively. As illustrated in FIG. 2, address vias 212 support the raised address electrodes 214a, 214b above each address pad 212a, 212b. In addition to supporting the raised address electrodes 214a, 214b, the address vias 213 relay a control or address voltage from the address pads 212a, 212b to the raised address electrodes 214a, 214b. The address pads 212a, 212b may be in communication with a control circuitry, such as an SRAM cell or the like, which selectively applies a control or address voltage to one of the two address pads 212a, 212b to create an electrostatic force between the micro-mirror 204 and the raised address electrodes 214a, 214b. A similar electrostatic force may be created between the micro-mirror 204 and the address pads 212a, 212b.

The range of motion allowed to micro-mirrors 204 may be limited by spring tips 226. During operation of DMD pixel element 200, spring tips 226 provide a landing point for micro-mirror 204. For example, when micro-mirror 204 is tilted in the direction of the raised address electrode 214a and address pad 212a, one or more spring tips 226 positioned proximate these address elements may operate as a landing point for micro-mirror 204. Conversely, when micro-mirror 204 is tilted in the direction of the raised address electrode 214b and address pad 212b, one or more spring tips 226 positioned proximate these address elements may operate as a landing point for micro-mirror 204. Thus, micro-mirror 204 may be tilted in the positive or negative direction until the micro-mirror 204 contacts one or more spring tips 226.

In reference to FIG. 2, in accordance with the present invention, instead of a hinge 216 occupying only the area beneath a pixel element 200, the hinge of a pixel element can traverse an area beyond the pixel element.

FIG. 3 shows one embodiment of this type of hinge. As opposed to beginning at one side of a pixel 200 and ending on the other side of the same pixel 200 as shown in FIG. 2, the hinges of FIG. 3 fall beneath at least a portion of micro-mirrors adjacent to the one that rotates about the hinge. For instance, in one embodiment, a micro-mirror 310 is mounted to a hinge 305 at a via 301. Hinge 305 is supported by vias 302 and 304. Vias 302 and 304 are located beneath adjacent pixels 306 and 307, and not beneath pixel 303. In this embodiment, vias 302 and 304 are located near the center of adjacent pixels 306 and 307. In this and other embodiments, the hinges can traverse adjacent or non-adjacent pixels and the hinges can be supported by vias located beneath adjacent or non-adjacent pixels. Traversing at least a portion of multiple pixels allows the hinge to be of a sufficient length that minimizes length related manufacturing difficulties and minimizes the voltage required to angle the pixel and twist the hinge. Multiple pixel traversal also allows a sufficient hinge thickness to minimize sagging effects.

The hinge portion of the DMD pixel elements 303, 306, and 307, in the illustrated embodiment, includes one or more hinges 305, 316, and 317 mounted with beams. Hinge 305, for example, is supported by hinge posts or hinge vias 302 and 304. The hinges 305, 316, and 317 may be made of aluminum, titanium, tungsten, aluminum alloys, such as AlTiO, or other material suitable for supporting and manipulating micro-mirrors 310.

In operation, the one or more hinges 305, 316, and 317 may be used to tilt each micro-mirror 310, 312, and 313 such that the micro-mirrors 310, 312, and 313 may be alternated between an active "on" state or an active "off" state. For example, hinges 305 may operate to tilt micro-mirrors 310 from a plus ten degrees to a minus ten degrees (or other suitable angles) to alternate the micro-mirrors 310 between the active "on" state condition and the active "off" state condition, respectively. The pixels of the present invention with hinges 305, 316, and 317 that can traverse adjacent and non-adjacent pixels can employ all, some, or none of the features or components within the hinge portion, the address portion, and the mirror portion discussed and illustrated in FIGS. 1-3.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A micromirror device comprising:
   a first, second and third deflectable members occupying respective adjacent areas of the micromirror device;
   a deflectable member support proximate the center of the first deflectable member;
   first and second torsion hinge supports respectively located beneath the second and third deflectable members and
   a torsion hinge spaced apart from and coupled to the first deflectable member by the deflectable member support, the torsion hinge positioned along an axis about which the deflectable member rotates and the torsion hinge being supported by the first and second torsion hinge supports.

2. The device of claim 1 wherein the hinge comprises a material selected from the group consisting of aluminum, titanium, tungsten, aluminum alloys, and combinations thereof.

3. The device of claim 1 wherein the deflectable members are reflective deflectable members; and
   the torsion hinge is operable to twist upon deflection of the deflectable member.

4. The device of claim 3 wherein the first torsion hinge support is located centrally beneath the second deflectable member and the second torsion hinge support is located centrally beneath the third deflectable member.

5. An array of deflectable mirror elements comprising:
   a first deflectable mirror element that is adjacent to both a second deflectable mirror element and a third deflectable mirror element; and
   wherein the first deflectable mirror element comprises a first hinge;
   wherein the first hinge is supported by a first support and a second support, the first support being located beneath the second deflectable mirror element and the second support being located beneath the third deflectable mirror element; and wherein the first hinge comprises a first mounting, said first mounting being connected to the center of said first deflectable mirror element for deflection of the first deflectable mirror element about an axis established by the first hinge.

6. The array of claim 5 wherein:

the second deflectable mirror element comprises a second hinge, the second hinge being supported by a third support and a fourth support, the third support being located beneath the first deflectable mirror element and the fourth support being located beneath a fourth deflectable mirror element adjacent to the second deflectable mirror element; and the second hinge comprises a second mounting, said second mounting being connected to the center of said second deflectable mirror element for deflection of the second deflectable mirror element about an axis established by the second hinge.

7. The array of claim 6 wherein:

the third deflectable mirror element comprises a third hinge supported by a fifth support and a sixth support, the fifth support being located beneath the first deflectable mirror element and the sixth support being located beneath a fifth deflectable mirror element adjacent to the third deflectable mirror element; and the third hinge comprises a third mounting, said third mounting being connected to the center of said third deflectable mirror element for deflection of the third deflectable mirror element about an axis established by the third hinge.

8. A method of reflecting light by:

tilting a plurality of deflectable mirror elements coupled to respective ones of a plurality of hinges, each hinge associate with each deflectable mirror element comprising a torsion portion operable to twist upon deflection of a corresponding one of the deflectable elements, the torsion portion traversing at least respective portions of at least two of the plurality of deflectable mirror elements other than the associated deflectable mirror element, and each hinge being supported by supports located beneath the respective at least two other deflectable mirror elements.

9. The method of claim 8 wherein the supports are connected proximate to the centers of the respective at least two other deflectable mirror elements.

10. The method of claim 8 wherein each hinge of the plurality of hinges comprises a material selected from the group consisting of aluminum, titanium, tungsten, aluminum alloys, and combinations thereof.

\* \* \* \* \*